US007147878B2

(12) United States Patent
Boatright

(10) Patent No.: US 7,147,878 B2
(45) Date of Patent: Dec. 12, 2006

(54) MODIFIED SOY PRODUCTS AND METHODS FOR REDUCING ODOR AND IMPROVING FLAVOR OF SOY PRODUCTS

(75) Inventor: William L. Boatright, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 637 days.

(21) Appl. No.: 10/421,955

(22) Filed: Apr. 24, 2003

(65) Prior Publication Data

US 2004/0005346 A1 Jan. 8, 2004

Related U.S. Application Data

(60) Provisional application No. 60/375,429, filed on Apr. 26, 2002.

(51) Int. Cl.
*A01N 65/00* (2006.01)
*A61K 36/58* (2006.01)
(52) U.S. Cl. .................. 424/761; 424/725; 424/76.1
(58) Field of Classification Search ............... 424/761
See application file for complete search history.

(56) References Cited

U.S. PATENT DOCUMENTS 3,855,238 A * 12/1974 Batesky et al. ............. 548/497

6,426,112 B1 7/2002 Boatright

OTHER PUBLICATIONS

W.L. Boatright et al., "Soy Protein Isolate Solubility and Surface Hydrophobicity as affected by Antioxidants", Journal of Food Science, vol. 60, No. 4, 1995, pp. 798-800.
W.L. Boatright et al., "Effect of Garlic Acid on the Aroma Constituents of Soymilk and Soy Protein Isolates", JAOCS, vol. 79, No. 4, (2002), pp. 317-323.
W.L. Boatright et al., "Headspace Evaluation of Methanethiol and Dimethyl Trisulfide in Aqueous Solutions of Soy-protein Isolates", Journal of Food Science, vol. 65, No. 5, 2000, pp. 819-821.
Q. Lei et al., "Development of a New Methanethiol Quantification Method Using Ethanethiol as an Internal Standard", Journal of Agriculture and Food Chemistry, vol. 49, No. 8, pp. 3567-3572.
Q. Lei et al., "Compounds Contributing to the Odor of Aqueous Slurries of Soy Protein Concentrate", Journal of Food Science, vol. 66, No. 9, 2001, pp. 1306-1310.

* cited by examiner

*Primary Examiner*—Michael G. Hartley
*Assistant Examiner*—James Rogers
(74) *Attorney, Agent, or Firm*—McDermott Will & Emery LLP

(57) ABSTRACT

A method for reducing odor in soy products and compositions containing soy products by adding or admixing a compound having one or more disulfide bonds to the soy product or composition. The disulfide compound includes a peptide containing at least cystine residue, a peptide or polypeptide containing at least one disulfide bond, L-cystine, D-cystine, DL-cystine and any combination thereof.

24 Claims, 2 Drawing Sheets

MODIFIED SOY PRODUCTS AND METHODS FOR REDUCING ODOR AND IMPROVING FLAVOR OF SOY PRODUCTS

CROSS REFERENCE TO RELATED APPLICATIONS

This application claims the benefit of U.S. Provisional Application No. 60/375,429, filed Apr. 26, 2002.

BACKGROUND OF THE INVENTION

While soybeans provide a high-quality protein, and there are increasing reports of health benefits from consuming soy protein products (FDA, 1999), the demand for soybeans in human foods has not been large. In 1971, less than one percent of the U.S. soybean crop was used as a protein source for human foods (Wolf and Cowen, 1971) and in 1999, this value was about the same (Soy Source, 1999). This is largely due to the undesirable flavor and odor associated with soy products (Kinsella, 1979; McLeod and Ames, 1988; Wilson et al., 1990; Freese, 1999). Jorge et al. (1999) demonstrated that the introduction of as little as two-percent powdered soymilk into chocolate significantly lowered sensory scores, with levels above six percent being deemed unacceptable. Incorporating soy protein isolate (SPI) at a level of two percent into frankfurters significantly lowered sensory scores (He and Segranek, 1996).

Boatright and Lei (2000) employed gas chromatography/olfactometry (GCO) to identify major odorants from the headspace of aqueous solutions of soy protein isolates (SPI) using both static and dynamic headspace methods. Based on dynamic headspace analyses, the most powerful odorants were dimethyl trisulfide (DMTS); methanethiol; hexanal; an unidentified charred sweaty feet-like odor; 2-pentyl furan; 2,3-butadione; and an unknown burnt-like odor. The most powerful odorants by static headspace analyses were dimethyl trisulfide, hexanal, methanethiol and 2-pentyl furan. Using deuterium labeled DMTS as an internal standard, DMTS was quantified at 60.1 and 45.5 ppb in the SPIs on a dry basis. This corresponds to odor values of 301 and 228, respectively in the 5% aqueous SPI slurries.

There is, therefore, a need for methods of reducing the odor associated with soy products and compositions containing soy products having reduced odor and improved flavor.

SUMMARY OF THE INVENTION

It is, therefore, an object of the present invention to provide methods of reducing odor associated with soy products and compositions containing soy products.

In a first emobidment of the method of the invention, an effective amount of a compound containing at least one disulfide bond is admixed with a soy product during processing of the soy product.

In a second embodiment of the method of the invention, an effective amount to at least one compound containing a disulfide bond is added to a soy product or composition containing a soy product.

It is also an object of the present invention to provide a soy product or composition containing a soy product, especially food Items, having decreased offensive odor and flavor.

It is still a further object of the present invention to provide a compound containing a disulfide bond that when admixed with a soy product or composition containing a soy product, or admixed with a soy product during processing of the soy product will reduce the concentration of odor producing compounds contained in the soy product.

These and other objects and characteristics of the present invention will become apparent from the further disclosure of the invention which is given hereinafter with reference to the accompanying drawing and detailed description of the invention.

DETAILED DESCRIPTION OF THE INVENTION

Figure 1:
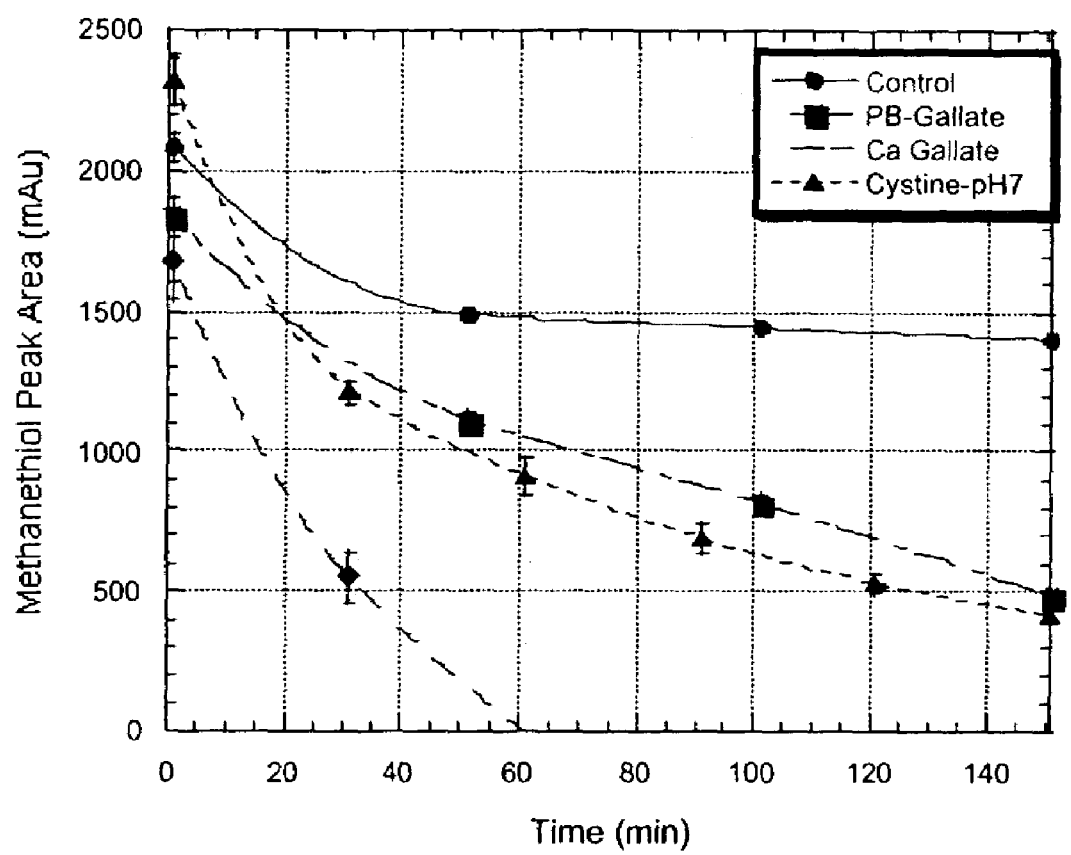
FIG. 1 is a graph showing the effect of cystine (5.2 mM) at pH 7 in 0.2 M phosphate buffer (PB) and gallic acid (6.6 mM) at pH 8 in 0.2 M phosphate buffer (and brought to pH 8 with $Ca(OH)_2$) on the rate of methanethiol disappearance.

The present invention provides soy products and methods of making soy products comprising less than 100% naturally-occurring methanethiol and/or DMTS. In particular, modified soy products wherein naturally occurring methanethiol and/or DMTS is present at about 1 to about 95% reduction over naturally-occurring levels and wherein the product has a reduction in the offensive odor associated with soy protein product are provided. Specifically, those soy protein products preferred are those comprising naturally-occurring methanethiol and/or DMTS at a percentage less than that of the a percentage selected from the group consisting of 100%, 95%, 90%, 85%, 80%, 75%, 70%, 65%, 60%, 55%, 50%, 45%, 40%, 35%, 30%, 25%, 20%, 15%, 10%, 5%, and 1%.

Methanethiol was quantified in soybean slurries prepared from two different soy protein concentrates (SPC) and two different soy protein isolates (SPI) with ethanethiol as an internal standard (Lei and Boatright, 2001a). Methanethiol levels were 172 and 237 parts per billion (ppb) dry basis in the SPC, and 237 and 167 ppb dry basis in the SPI. These values correspond to odor values of 86 and 118 in 10% SPC slurries, and 80 and 56 in 6.7% SPI slurries.

Volatile compounds from soymilk were analyzed by gas chromatography/olfactometry/mass spectrometry (GCO/MS) with direct injection of various volumes of static headspaces (Boatright, 2000 & 2002). The most powerful odorants, determined by the minimum headspace volume required for detection by olfactometry, were determined to be hexanal; acetaldehyde, methanethiol, DMTS, and 2-pentyl furan.

The present invention provides methods for reducing the odor associated with soy products, specifically the odor associated with the presence of methanethiol and DMTS.

Measurement of the percent reduction can be accomplished as described in the examples, or by simply sniffing the product before and after reduction of the methanethiol and/or DMTS. Alternatively, quantification of methanethiol and DMTS can be done, so as to remove the necessity of the subjective test. The odor threshold for methanethiol in water is about 200 parts per trillion (ppt) or 200 ng per liter of water. Therefore, in light of the present invention, reduction below these levels in soy protein or mixtures containing soy proteins would improve soy protein product odor and flavor. Levels less than 10 ppt are optimum, although levels less than 0.1 parts per million (ppm) also improve flavor and odor. Preferably, soy protein products of the invention have levels of approximately less than 0.1 ppm to about 0.01 ppm, more preferably about 0.001 ppm to about 0.0001 ppm, and most preferably, about 0.00001 ppm or less.

The odor threshold for DMTS is 5–10 ppt in water. Therefore, in light of the present invention, reduction below these levels in soy protein or mixtures containing soy proteins would improve soy protein product odor and flavor. Optimum levels are those less than 5 ppt, although levels less than 0.05 parts per million also improve flavor and odor. More preferred are soy protein products with levels of approximately less than: 0.005 ppm, 0.0005 ppm, 0.00005, and 0.000005 ppm.

Alternatively, the odor threshold of methanethiol in air is 0.0016 $mg/m^3$ of air. Therefore, in light of the present invention, reduction below these levels in the headspace above soy protein products (or mixtures containing soy proteins) would improve soy protein product odor and flavor. Levels less than 0.0016 $mg/m^3$ are optimum, although levels less than 0.1 $mg/m^3$ would also improve flavor and odor. More preferred are soy protein products with levels of approximately less than 0.1 $mg/m^3$, 0.01 $mg/m^3$, and 0.001 $mg/M^3$.

The odor threshold for DMTS in air is 0.0012 $mg/m^3$. Therefore, in light of the present invention, reduction below these levels in the headspace above soy protein products (or mixtures containing soy proteins) would improve soy protein product odor and flavor. Levels less than 0.0012 $mg/m^3$ are optimum, although levels less than 0.01 $mg/m^3$ would also improve flavor and odor. More preferred are soy protein products with levels of approximately less than 0.01 $mg/m^3$, 0.008 $mg/m^3$, and 0.001 $mg/m^3$.

The soy protein products and compositions of the present invention can contain a soy component such as, for example, soy flour, soy bean, soy meal, soy paste, soy milk, soy protein concentrates and soy protein isolates. Starting materials for making the present soy protein products can be obtained commercially from Archer Daniels Midland, (Decatur, Ill.) or from other commercial sources.

Also provided are food items containing a soy protein product of the present invention, such as a drink, a fast food item, a vegetarian dish, a meat item, an imitation seafood item, a structured meat product, an oil, a dairy item or an imitation cheese. The list above is not intended to be limiting. In fact, the present invention will allow new products to be fabricated since odor was a barrier to using soy protein products in food items previous to this invention. Soy protein can now be used instead of any protein in recipes in which protein is incorporated. Starting materials for making these products are widely available commercially.

As used herein, the terms "soybean(s)" or "soy" or "soy product(s)" means any soybean based product, including, but not limited to, whole soybeans, soybean pieces, soy meal, soybean flour, soybean milk, soy protein concentrate, soy protein isolate, etc. The "disulfide compounds" used in the methods and compositions disclosed herein include compounds having one or more disulfide bonds and which reduce offensive soy odor. The term "disulfide bond" used herein stands for a sufhydryl (mercaptan) group directly bonded to another sulfhydryl group. Moreover, for the purposes of the present invention, the term "a" or "an" entity refers to one or more of that entity; for example, "a deodorant compound" refers to one or more of those compounds or at least one compound. As such, the terms "a" (or "an"), "one or more" and "at least one" can be used interchangeably herein. It is also to be noted that the terms "compris-ing", including", and "having" can be used interchangeably. Furthermore, a compound "selected from the group consisting of" refers to one or more of the compounds in the list that follows, including mixtures (i.e. combinations) of two or more of the compounds. In addition the symbol "~" as used herein means approximately, and the term "headspace" means the volume remaining above the sample in a partially filed container composed of atmospheric gases (nitrogen, oxygen, etc.) and volatile compounds from the sample in the container.

Also, according to the present invention, an isolated molecule is a compound that has been removed from its natural milieu. As such, "isolated" does not necessarily reflect the extent to which the compound has been purified. An isolated compound of the present invention can be obtained from its natural source and partially purified such that other components remain present in the mixture, or can be produced using molecular biology techniques, or can be produced by chemical synthesis, for example.

Soy protein products provided by the present invention include those which have substantially reduced levels of offensive odors to humans, wherein odor offensiveness may be determined subjectively by a group of testers wherein a positive reduction in odor is perceived by 9 out of 10 people polled. In other words, soy protein products comprising a maximum of 10, 20, 30, 40, 50, 60 or 90 percent of naturally-occurring methanethiol and/or DMTS are provided.

Also, the present invention provides methods to reduce offensive odors in a soy protein product or composition, comprising reducing the levels of methanethiol and/or DMTS in the soy protein product or composition. For example, methanethiol and/or DMTS levels of soy protein products and compositions can be reduced over typical levels by any of the following methods:

(a) Adding to a soy product or composition, an odor-reducing effective amount of a compound having at least one disulfide bond. The disulfide bond-containing compound may be, for example, a peptide containing at least one cystine residue; a peptide or polypeptide containing at least one disulfide bond; L-cystine; D-cystine; DL-cystine or any combination thereof. Preferably, the disulfide bond-containing compound is a food grade disulfide reactant. In a most preferred embodiment, the disulfide bond-containing compound is L-cystine, D-cystine, or DL-cystine.

(b) Adding to a soy product or composition a compound or agent capable of reacting with a sulfhydryl group (mercaptan). Such compounds or agents include, but are not limited to, compounds having one or more phenolic hydroxyl groups, e.g., a compound having a hydroxyl group directly bonded to an aromatic ring, such as a benzene ring, pyridine, thiophene, naphthalene, biphenyl, benzoic acid, catechins, and the like, which compounds have a structure that can be converted into ketones by oxidation of a hydroxyl group.

(c) Admixing with a soy product during processing of the soy product, an odor-reducing effective amount of a compound having at least one disulfide bond. The disulfide bond-containing compound may be for example, a peptide containing at least cystine residue; a peptide or polypeptide containing at least one disulfide bond; L-cystine; D-cystine; DL-cystine or a combination thereof. Preferably, the disulfide bond-containing compound is a food grade disulfide reactant. In a most preferred embodiment, the disulfide bond containing compound is L-cystine, D-cystine, or DL-cystine.

(d) Admixing with a soy product during processing of the soy product, an odor-reducing effective amount of a compound or agent capable of reacting with a sulfhydryl group.

(e) Genetically modifying soybean plants to produce soy beans and seed containing an elevated level of cystine residues in one or more soy bean proteins and low production of methanethiol and/or DMTS.

The present invention provides improved soy products, wherein the improvement is a reduction in offensive odors resulting from a reduction in methanethiol and/or DMTS concentrations in the soy protein.

The present invention also provides soy products or compositions comprising soybeans and a methanethiol deodorant and/or DMTS deodorant. The terms "methanethiol deodorant" and "DMTS deodorant" are used herein to mean disulfide bond-containing compounds or agents that reduce the levels of methanethiol or DMTS, respectively. Preferred methanethiol deodorants and DMTS deodorants are peptides or polypeptides containing at least one disulfide bond, L-cystine, D-cystine, DL-cystine, and combinations thereof. Most preferred methanethiol deodorants and DTMS deodorants are L-cystine, D-cystine, and DL-cystine.

Also provided are odor-reduced soybean products or compositions containing soybeans or processed soybeans and a disulfide bond-containing compound or a sulfhydryl reactive compound. The soybean or processed soybeans may be in the form of soy flour, soybean parts, soy meal, soy paste, soy milk, soy protein, soy protein concentrates, soy protein isolates, and the like.

The present invention provides a means for reducing the level of any of the sulfur-containing odiferous compounds, including any sulfur-containing odorant identified in the future. With regard to the odor-reducing compounds in the examples and specifically pointed out in the detailed description, the following are guidelines for amounts of odor-reducer and soy products:

Approximately 150 ppm of a odor-reducing compound such as L-cystine in soy milk, and approximately 1% on a dry basis of SPI works quite well. However, variations thereon are within the skill of the art. Indeed, ~1 to ~10,000 ppm of the odor-reducing compound works well in a 7% SPI aqueous slurry, and it is easily recognizable that the more soy present in a solution or other formulation, addition of more odor-reducing compound would be preferred. Therefore, the following ppm of odor-reducing compounds are acceptable: ~1 to ~100, ~50 to ~150, ~100 to ~200, ~150 to ~250, ~200 to ~300, ~250 to 350, ~300 to ~400, ~350 to ~450, ~400 to ~500, ~450 to ~550, ~500 to ~600, ~550 to ~650, ~600 to ~700, ~650 to ~750, ~700 to ~800, ~750 to ~850, ~800 to ~900, ~850 to ~950, ~900 to ~1000, ~1000 to ~2000, ~2000 to ~3000, ~3000 to ~4000, ~4000 to ~5000, ~5000 to ~6000, ~6000 to ~7000, ~7000 to ~8000, ~8000 to ~9000, ~9000 to ~10000. The upper and lower limits are not fixed at ~1 and ~10,000. They are determined by the overall constitution of the formula, and the amount of desired methanethiol- and/or DMTS-associated odors.

It is noted that the content of disulfides (cystine) and free sulfhydryls (cysteine) in SPI, for example, is about 1.75 mg disulfide per gram SPI (about 6.5 mg cystine per gram SPI) and about 0.28 mg sulfhydryl per gram SPI (about 1.0 mg cysteine per gram SPI). Most of the disulfide bonds are probably present in polypeptides. (Boatright et al., 1995, Soy Protein Isolate Solubility and Surface Hydrophobicity as Effected by Antioxidants, J. Food Sci., 60:798). In a preferred embodiment, an odor reducing effective amount of the methanethiol deodorant is an amount capable of reducing methanethiol of a soy product below ~200 ppt or ~200 ng/L water (or 0.0016 mg/m$^3$ in the headspace above soy products). Most preferably, the amount of DMTS deodorant used reduces DMTS below ~10 ppt (or 0.0012 mg/m$^3$ in the headspace above soy products).

For the soy aspect of the products and compositions of the invention, the range of percent soy can be between 0.0001 to 100%. Therefore, the soy can, be any of the following percent in the formulation: 1 to 90%, 5 to 80%, 5 to 70%, 5 to 60%, 5 to 50%, 5 to 40%, 5 to 30% etc. Most formulations present on the market are limited in the amount of soy included because of the undesirable odor. The formulations that will be useful under the present invention are likely to contain more soy than the amounts previously used. Preferred are compositions which contain ~5 to ~25% soy. Also provided are methods to make a soybean products with reduced offensive odor, comprising admixing a methanethiol deodorant and/or DTMS deodorant of the present invention during any stage of soybean processing steps with the soybean product such that the processed soybean product has reduced offensive odor.

EXAMPLE 1

Preparation of Soymilk and SPI

Soybeans and defatted flour were obtained from the Archer Daniels Midland Company (Decatur, Ill.). For soymilk, whole soybeans were soaked in water for 10 hours, drained and rinsed several times. The hydrated soybeans were combined with water (1 part soybeans to 10 parts water). The soybeans/water mixture was then ground in a Waring blender on medium speed for one minute. The resulting slurry was immediately transferred into a glass flask and placed in a boiling water bath. The soybean slurry was stirred and brought to 85° C. within 8 minutes where it was held for 15 minutes. The soymilk was then cooled to 40° C. in an ice bath, filtered through cheesecloth, bottled and refrigerated (4° C.). L-cystine was added directly to the process water prior to adding the soybeans to achieve an overall concentration of 300 ppm.

Laboratory SPI was prepared by dispersing hexane-defatted soybean flour in water (1 part flour to 10 parts water) at 22° C. followed by additions of 1 N sodium hydroxide, as needed, until a pH of 9 was achieved and maintained for 15 minutes. After centrifugation at 1500×g for 10 minutes, the supernatant was adjusted to a pH of 4.5 with 1 N HCl to precipitate proteins. Following centrifugation at 1500×g for 10 minutes, the precipitate was washed twice with water, and the protein isolate was adjusted to pH 7 with 1 N NaOH. If L-cystine was added, it was added at this point in the processing using 0.3 g per 100 g of defatted flour. The resulting slurry was immediately transferred into a glass flask and placed in a boiling water bath. The protein slurry was stirred and brought to 77° C. within 4 minutes where it was held for 15 seconds, cooled to 40° C. in an ice bath and freeze-dried.

Static Headspace Analyses

For static headspace analyses, soymilk or SPI solutions were placed in a 1 L flask sealed with a septum and stirred. A specific volume of the unconcentrated headspace were withdrawn after various times using a 25 mL gas tight syringe (preheated to 45° C.) equipped with an inert gas sampling valve.

Gas Chromatography, Olfactometry and Mass Spectroscopy (GCO/MS)

GCO/MS was accomplished on a Hewlett Packard Model 5890 Series II GC with a 5971A mass spectrometer, a MS-Novent system (SGE International, Ringwood, Australia) and an indirect liquid-nitrogen trap (SGE International, Ringwood, Australia) at the beginning of the column to cryo-focus analytes. The injection sequence began by bringing the liquid-nitrogen trap to −60° C. The purge valve was closed for the first two minutes of the run. The MS No-vent was then turned on and the GC inlet septum purge was blocked. Up to 25 mLs of the sample headspace was injected at a rate of 5 mL/min followed by a 2 minute wait. The MS No-vent was then turned off followed by a 0.5 minute wait. The cap on the septum purge was removed, the flow of nitrogen to the cryo-trap was stopped and the GC run was begun. The column was an EC-5 capillary column (30 m×0.53 mm i.d.) with 1.2 pm film thickness (Alltech Associates, Inc., Deerfield, Ill.). The helium flow rate through the columns was about 3 mL/minute with 2 mL/minute emerging from the sniff port (SGE International., Ringwood, Australia). The column temperature was held at 40° C. for 2 minutes, then increased at 5° C./minute to 165° C. where it was held for 5 minutes, then to 220° C. at 20° C./minute where it was held for 2.75 minutes. The injection port temperature was maintained at 130° C. All determinations were performed in duplicate. Minimum reported headspace volumes necessary to detect odorants by olfaction required confirmation by two investigators. Identification of compounds were by comparison of mass spectra to a spectral database (NIST98) (ChemSW, Inc., Fairfield, Calif.); comparison to retention times of authentic standards; and comparison of olfactory response to authentic standards.

Quantifying selected headspace odorants was accomplished by setting the electron ionization detector to detect selected ions (SIM) in order to increase the sensitivity of the detector. Ethanethiol was used as an internal standard by first injecting the headspace sample from a soy product with cryofocusing followed by injecting 13.4 ng ethanethiol. Preparation of the ethanethiol standard, standard curves and quantification procedures for various odorants is described by Boatright (2002). The injection port temperature was maintained at 130° C. Duplicate injections were performed with both the control and treated soy product. Odor values were calculated by converting the odorants concentration in mg/m$^3$ and dividing by its published odor threshold value. For example, the odor value for methanethiol in a sample containing 0.248 mg/20 mLs headspace is:

0.248 ng/20 mL headspace·1000 mL/L=12.4 ng/L 12.4 ng/L·1 ug/1000 ng=0.0124 µg/L 0.0124 µg/L·1000 L/m$^3$=12.4 ug/m$^3$ 12.4 ug/m$^3$·1000 mg=0.0124 mg/m$^3$ Odor Value=0.0124 mg/m$^3$·0.0016 mg/m$^3$=8

Measurement of Deodorizing Activity

Either L-cystine or gallic acid (0.1 g) was dispersed in 50 mLs 0.2 M phosphate buffer (pH 8 for gallate and pH 7 for L-cystine), using water from a Barnstead Nanopure 4-Module System (Fisher Scientific, Pittsburgh, Pa.). In a 3 mL conical vial equipped with a Teflon-lined septum, 250 µL of the L-cystine (or gallic acid) premix was added to 250 µL of ca. 800 ppm methanethiol solution and 500 µL additional phosphate buffer. For a control, the deodorant premix was replaced with water. Samples were removed with a syringe through the septum and injected into the HPLC at various times after stirring at 25° C.

HPLC separations were accomplished on a Hewlett Packard (Willmington, Del.) Model 1100 HPLC equipped with binary pumps, a diode-array detector, ChemStation Software and a 20 µL injection loop. Analytes were separated on a Rainin Dynamax Microsorb 5 pm C-18 column (4.6×250 mm) with a 5 µm C18 guard column (4.6×15 mm) (Ridgefield, N.J.). The flow rate was 1.0 mL per minute. A solvent gradient of % methanol/H$_3$PO$_4$ (999:1, vol/vol) in water/ H$_3$PO$_4$ (999:1, vol/vol) was 0% at zero time to 10% at 20 minutes then back to 0% by 30 minutes. Methanethiol was monitored at 210 nm.

EXAMPLE 2

The Effect of Adding L-cystine to Commercial SPI Slurries

Figure 2:
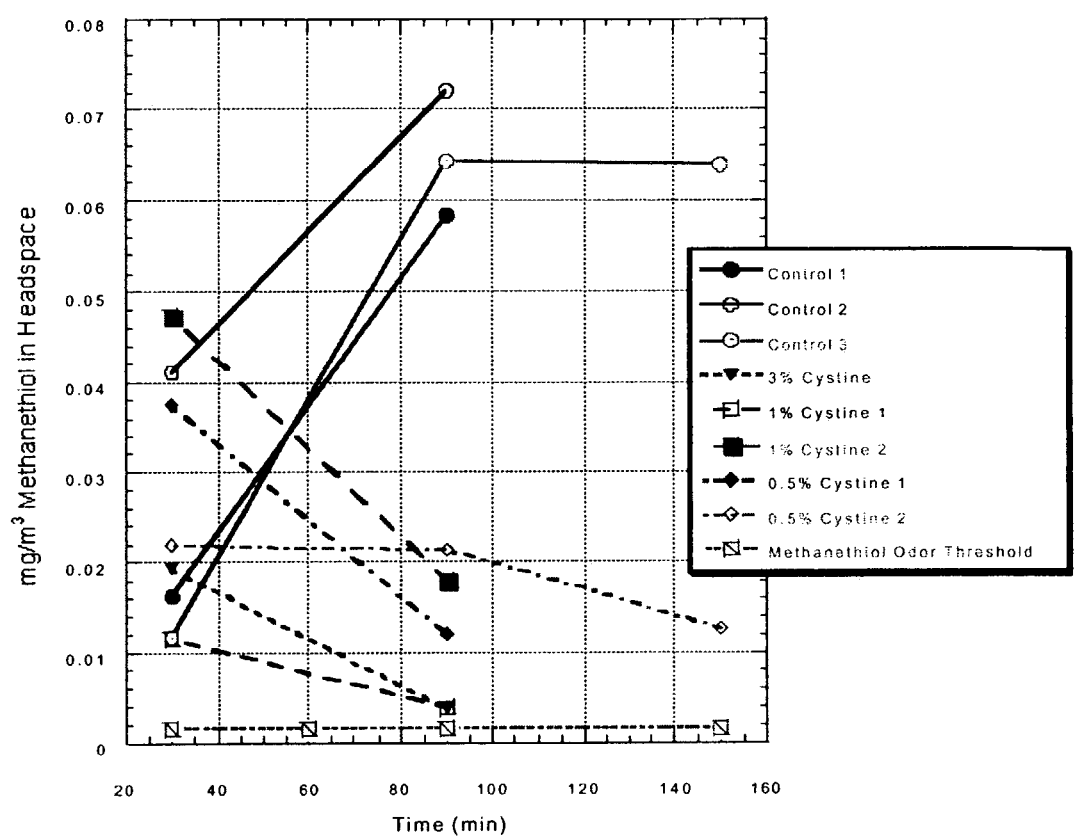
FIG. 2 is a graph showing the effect of various levels of cystine on the headspace concentration of methanethiol in 5% commercial SPI slurries over time.

FIG. 1 shows that added L-cystine is about as effective at "removing" methanethiol from solution at pH 7 as gallic acid is at pH 8. Data for L-cystine is the mean values from duplicate runs with each of two different sources (Sigma Chemical Co. and ICN Biomedicals Inc.). Other advantages of L-cystine is that it is already a "generally recognized as safe" (GRAS) food additive and it contributes no color. Because it is effective at neutral pH, its effect can be observed by simply dry-mixing with SPI prior to adding water. This is shown in FIG. 2. Rather than the typical increase in sulfur-containing odorants in the headspace above SPI slurries over time, L-cystine causes a substantial reduction in methanethiol. In the controls, the level of methanethiol increased to as high as 45 times above its odor threshold while the addition of 0.5 percent L-cystine prevented this increase, and even contributed to a decrease, of methanethiol.

The deodorizing effect of L-cystine can be obtained, and was observed to be most effective, by incorporating it into soy products during processing. To demonstrate this, soymilk and SPI were prepared in the laboratory with L-cystine added during processing. In both cases, the levels of methanethiol and DMTS were rendered completely undetectable using a GC/MS method with selective ion monitoring to increase the sensitivity of the detector or by olfactory detection. The headspace above the control soymilk sample contained 12 and 0.3 µg/m$^3$ of methanethiol and DMTS, respectively. Soymilk prepared with the addition of L-cystine had no detectable levels of either methanethiol or DMTS as measured by GC/MS with selective ion monitoring or by olfactometry. Similarly, samples of SPI prepared in the laboratory when dispersed as a 3.3 percent aqueous slurry had headspace methanethiol and DMTS levels of 14 and 1.5 µg/m$^3$, respectively. When the SPI was processed with added L-cystine, there were no detectable levels of either methanethiol or DMTS as measured by GC/MS with selective ion monitoring or by olfactometry.

EXAMPLE 3

Results from a New Rapid Method for Quantifying Methanethiol and DMTS in the Headspace above the Soy Product Boatright (2000) defined the typical levels of DMTS in soy protein products by stating that "levels less than 0.05 parts per million would also improve flavor and odor. He went on to demonstrate a method of quantifying DMTS using a stable-isotope labeled DMTS as an internal standard. Using this method, levels of DMTS in two soy protein isolates (SPI) were shown to be 0.06 and 0.045 parts per million (dry basis). Furthermore, the typical levels of methanethiol in soy protein products was defined by stating that "levels less than 0.1 parts per million would also improve flavor and odor." Lei and Boatright quantified methanethiol in aqueous slurries of soy protein isolates and concentrates using a derivatization procedure with ethanethiol as an internal standard. The level of methanethiol was 0.237 and 0.167 ppm (dry basis) in two samples of SPI and 0.172 and 0.237 ppm (dry basis) in two samples of soy protein concentrates. While both of these quantification procedures measure the quantity of odorant in the aqueous slurry of soy product, there are also methods to quantify odorants in the headspace (air) above samples of soy protein products or mixtures containing soy products. These different methods are represented by the published odor thresholds of methanethiol and DMTS in either aqueous solutions or in air. The published odor thresholds for methanethiol and DMTS in water are 0.0002 and 0.00001 parts per million, respectively (Buttery et al., 1970; Whitfield and Last, 1991). However, when someone smells a sample, what they actually perceive are the odor compounds that are in the air above the sample. Thus, there is another set of published odor threshold levels for methanethiol and DMTS in air, 0.0016 and 0.0012 mg/m$^3$, respectively (Amoore and Hautala,1983; Boatright, 2002). Boatright (2002) devised a simple and rapid GC/MS method to quantify methanethiol, DMTS, hexanal, and 2-pentyl furan in the headspace above soymilk and aqueous slurries of soy proteins by cryofocusing an internal standard along with static headspace volatiles. Results from the analyses of two commercial SPI samples, a laboratory prepared SPI sample, and soymilk prepared in the laboratory are presented in Table 1.

TABLE 1

Concentrations[a] of Odorants (mg/m$^3$) in the Headspaces Above 5% Solutions of SPI and Soymilk Using Ethanethiol as an Internal Standard Added at the GC Injection Point.

| Soy Protein Products | Methanethiol | Hexanal | DMTS | 2-Pentyl furan |
|---|---|---|---|---|
| Commercial SPI #1[b] | 0.184 (115)[c] | 1.508 (26) | 0.011 (9) | 0.592 (7) |
| Commercial SPI #2 | 0.055 (35) | 1.244 (21) | 0.005 (4) | 0.626 (7) |
| Commercial SPI #3 | 0.085 (53) | 1.424 (25) | 0.006 (5) | 0.671 (7) |
| Laboratory SPI[d] | 0.023 (14) | 1.04 (18) | 0.005 (4) | |
| Laboratory Soymilk[d] | 0.024 (15) | 5.974 (103) | 0.013 (11) | 0.655 (7) |

[a]Samples were withdrawn at 30 and 90 minutes.
[b]Same SPI used by Lei and Boatright, 2001.
[c]Values in parenthesis are odor values in air.
[d]Boatright 2002.

EXAMPLE 4

Conversion of Previous GC/olfactometry Results into Minimum Headspace Levels (mg/m$^3$) of Methanethiol and DMTS from SPI, SPC and Soymilk A great deal of initial soy olfactory work involved determining the minimum headspace required to detect certain odorants by gas chromatography-olfactometry. With this method, two researchers (Dr. Boatright and Dr. Qingxin Lei) would sniff the odorants eluting from the GC resulting from injecting progressively smaller volumes of headspace from above the soy product. The lowest volume of headspace injected, which resulted in both researchers being able to detect the odor, was noted (Boatright and Lei, 2000; Boatright 2000; Boatright, 2002; Lei and Boatright, 2001b). The same two researchers determined the minimum quantity of selected odorants (by weight eluting from the sniff port) necessary to be detected by GC-olfactometry (Boatright, 2002). This was found to be 0.08 ng for methanethiol, 3.33 ng for hexanal and 0.067 ng for DMTS. Using this information previous static headspace GCO results can be converted into a minimum headspace concentration in mg/cubic meter. For example, using the static headspace from Boatright and Lei (2000) for 5 percent aqueous commercial SPI slurries, the minimum headspace to detect methanethiol was 10 mLs, hexanal, 2.5 mLs, 2-pentyl furan 25 mLs and DMTS 1.25 mLs. Using the minimum quantity necessary to detect these odorants at the GC-sniff port, we can calculate the minimum concentration of methanethiol as 0.012 mg/m$^3$, hexanal as 2.0 mg/m$^3$ and DMTS as 0.048 mg/m$^3$. The corresponding odor value (in air) for these three compounds is 8, 34 and 67 (respectively).

The following is a sample calculation for converting minimum quantity to detect methanethiol by GCO to concentration in the headspace (mg/m$^3$) and corresponding odor value (in air):

0.08 ng.mL(3·2)*·1000 mL/L·1000 L/m$^3$·1 mg/10$^6$ ng=0.012 mg/m$^3$ 0.012 mg/m$^3$·0.0016=an odor value of 8

*Two-thirds of the material injected into the GC eluted at the sniff port.

TABLE 2

Minimum Volumes to Detect Methanethiol and DMTS in Static Headspaces by C-Olfactometry (mg/m$^3$) in Headspaces.

| Soy Protein Products | Methanethiol | DMTS |
|---|---|---|
| Commercial SPI #1[a] | 0.012 (g)[f] | 0.084 (67) |
| Commercial SPI #2[a] | 0.006 (4) | 0.021 (18) |
| Commercial SPI[b] | 0.008 (5) | 0.040 (34) |
| Commercial SPI[c] | 0.024 (15) | 0.004 (3) |
| Commercial SPC[d] | 0.024 (15) | 0.007 (6) |
| Commercial SPC[d] | 0.008 (5) | 0.007 (6) |
| Soymilk[e] | 0.048 (30) | 0.020 (17) |

[a]Table 3, Boatright 2000 and Boatright and Lei, 2000.
[b]Table 4, Boatright 2000.
[c]Table 5, Boatright 2000.
[d]Lei and Boatright, 2001.
[e]Table 6, Boatright 2000; Boatright 2002.
[f]Values in parenthesis are odor values in air.

REFERENCES

Amoore, J. E. and E. Hautala, 1983. Odor as an Aid to Chemical Safety: Odor Thresholds Compared with Threshold Limit Values and Volatiles for 214 Industrial Chemicals in Air and Water Dilution, *J. AppL Tox.*, 3:272–290.

Boatright, W. L. 2002. Effect of Gallic Acid on the Aroma Constituents of Soymilk and Soy Protein Isolates, *Journal of the American Oil Chemists' Society*, in press.

Boatright, W. L. and Q. Lei. 2000. Headspace evaluation of methanethiol and dimethyl trisulfide in aqueous solutions of soy protein isolates, *J. Food Science*, 65:819–821.

Boatright, W. L., 2000. "Soybean Protein Products Having Improved Odor and Flavor and Methods Related Thereto," U.S. patent application Ser. No. 09/621,368 and World Intellectual Property Organization Patent Application No. WO 0106866 A1.

Buttery, R. G., R. M. Seifert and L. C Ling. 1970.Characterization of some volatile potato components. *J. Agric. Food Chem.*, 18, 538–539.

Devos, M. and L. J. Van Gemert, 1990. Appendix B: Original and Standard Threshold Values, In: *Standardized Human Olfactory Thresholds*, Oxford University Press, New York, pp 23–136.

FDA, 1999. *Food Labeling: Health Claims; Soy Protein and Coronary Heart Disease*. Federal Register, Oct. 26,1999 64 (206) 57699–57733.

Freese B. Soy is Healthy, but Will We Eat It? 1999. *Successful Farming* 97(7). Available from: <http://www.agriculture.com/sfonline/sf/1999/soy.html>; accessed Aug. 9. (1999).

He, Y. and J. G. Segranek, 1996. Frankfurters with lean finely textured tissue as affected by ingredients, *J. Food Science.*, 61:1275–1280.

Jorge, M. C., L. Rodriguez, J. L. Rodriguez and C. Beltrán, 1999. Replacement of Whole-Milk Powder with Soy Milk in Chocolate. *Alimentaria*, 36:49–53.

Kinsella, J. E., 1979. Functional Properties of Soy Proteins, *J. Am. Oil Chem. Soc.* 56(3):242–258.

Lei, Q. and W. L. Boatright, 2001a. Development of a New Methanethiol Quantification Method Using Ethanethiol as an Internal Standard, *J. Agric. Food Chem.*, 49(8) 3567–3572.

Lei, Q. and W. L. Boatright, 2001 b. Compounds Contributing to the Odor of Aqueous Slurries of Soy Protein Concentrates, *J. Food Science,* 66(9):1306–1310.

McLeod, G. and J. Ames, 1988. Soy Flavor and Its Improvement, *Crit. Rev. Food Sci. Nutr.* 27: 219–402.

Sessa, D. J. and J. J. Rackis, 1977. Lipid-Derived Flavors of Legume Protein Products, *J. Am. Oil Chem. Soc.,* 54:468.

United Soybean Board. 1999. *Soybeans Checkoff Research Shows Growing Appetites for Soy Foods*. September 16. Available from www.unitedsoybean.org/. Accessed on Mar. 18, 2002.

Whitfield, F. B. and J. H. Last, 1991. Vegetables in *Volatile Compounds in Foods and Beverages*, ed. by H. Maarse, Marcel Dekker, Inc., New York, N.Y., pp. 214 and 237.

Wilson, L A, Johnson L A, Hayenga M L, Love M H, 1990. Protein Used for Food and Industrial Products. In: Greiner Calif., editor. *Economic Implications of Modified Soybean Traits*. Ames, Iowa: Iowa Agricultural and Home Economics Experiment Station, Ames, Iowa., pp 11–19.

Wolf W. J. and J. C.Cowan, 1971. *Soybeans as a Food Source*, Boca Raton, Fla., CRC Press, Inc. pp. 33–77.

While this invention has been described with reference to several preferred embodiments, it is contemplated that various alterations and modifications thereof will become apparent to those skilled in the art upon a reading of the preceding detailed description. It is therefore intended that the following appended claims be interpreted as including all such alterations and modifications as fall within the true spirit and scope of this invention.

What is claimed is:

1. A method of reducing odor in a soy product comprising the step of admixing an effective amount of L-Cystine, D-Cystine, DL-cystine and any combination thereof combination thereof during processing of the soy product to reduce at least one odor producing compound in a soy component in a soy product.

2. The method of claim 1, wherein the compound having one or more disulfide bonds is L-cystine.

3. The method of claim 1, wherein the soy component is selected from the group consisting of a soybean, soy meal, soy flour, soy paste, soy milk, soy protein concentrates and soy protein isolates.

4. The method of claim 1, wherein the odor producing compound is selected from the group consisting of methanethiol, dimethyl trisulfide, hexanal and 2-pentyl furan.

5. The method of claim 1, wherein the odor producing compound is methanethiol or dimethyl trisulfide and the naturally occurring level of the compound in the soy component is reduced by about 1% to about 95%.

6. The method of claim 1, wherein the odor producing compound is methanethiol or dimethyl trisulfide and the naturally occurring level of the compound in the soy component is reduced by about 95%.

7. The method of claim 1, wherein the odor producing compound is methanethiol and the concentration of methanethiol in air is reduced to less than 0.1 $mg/m^3$.

8. The method of claim 2, wherein the odor producing compound is methanethiol and the concentration of methanethiol in air is reduced to less than 0.1 $mg/m^3$.

9. The method of claim 1, wherein the odor producing compound is methanethiol and the concentration of methanethiol in air is reduced to less than 0.0016 $mg/m^3$.

10. The method of claim 1, wherein the odor producing compound is dimethyl trisulfide and the concentration of dimethyl trisulfide in air is reduced to less than 0.01 $mg/m^3$.

11. The method of claim 2, wherein the odor producing compound is dimethyl trisulfide and the concentration of dimethyl trisulfide in air is reduced to less than 0.01 $mg/m^3$.

12. The method of claim 1, wherein the odor producing compound is dimethyl trisulfide and the concentration of dimethyl trisulfide in air is reduced to less than 0.0012 $mg/m^3$.

13. A method of reducing odor of a soy component in a soy product or composition containing the soy product comprising the step of adding an effective amount of L-Cystine, D-Cystine, DL-cystine and any combination thereof to the soy product or the composition containing the soy product to reduce the concentration of at least one odor producing compound in the soy component.

14. The method of claim 13, wherein the compound having one or more disulfide bonds is L-cystine.

15. The method of claim 13, wherein the soy component is selected from the group consisting of a soybean, soy meal, soy flour, soy paste, soy milk, soy protein concentrates and soy protein isolates.

16. The method of claim 13, wherein the odor producing compound is selected from the group consisting of methanethiol, dimethyl trisulfide, hexanal and 2-pentyl furan.

17. The method of claim 13, wherein the odor producing compound is methanethiol or dimethyl trisulfide and the naturally occurring level of the compound is reduced by about 1% to about 95%.

18. The method of claim 13, wherein the odor producing compound is methanethiol or dimethyl trisulfide and the naturally occurring level of the compound is reduced by about 95%.

19. The method of claim 13, wherein the odor producing compound is methanethiol and the concentration of methanethiol in air is reduced to less than 0.1 $mg/m^3$.

20. The method of claim 14, wherein the odor producing compound is methanethiol and the concentration of methanethiol in air is reduced to less than 0.1 mg/m$^3$.

21. The method of claim 13, wherein the odor producing compound is methanethiol and the concentration of methanethiol in air is reduced to less than 0.0016 mg/m$^3$.

22. The method of claim 13, wherein the odor producing compound is dimethyl trisulfide and the concentration of dimethyl trisulfide in air is reduced to less than 0.01 mg/m$^3$.

23. The method of claim 14, wherein the odor producing compound is dimethyl trisulfide and the concentration of dimethyl trisulfide in air is reduced to less than 0.01 mg/m$^3$.

24. The method of claim 13, wherein the odor producing compound is dimethyl trisulfide and the concentration of dimethyl trisulfide in air is reduced to less than 0.0012 mg/m$^3$.

* * * * *